(12) United States Patent
Jennings

(10) Patent No.: US 6,713,739 B2
(45) Date of Patent: *Mar. 30, 2004

(54) MICROWAVE-ASSISTED CHEMICAL SYNTHESIS INSTRUMENT WITH FIXED TUNING

(75) Inventor: William Edward Jennings, Wingate, NC (US)

(73) Assignee: CEM Corporation, Matthews, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/248,052

(22) Filed: Dec. 13, 2002

(65) Prior Publication Data

US 2003/0089706 A1 May 15, 2003

Related U.S. Application Data

(63) Continuation of application No. 09/773,846, filed on Jan. 31, 2001.

(51) Int. Cl.[7] .............................................. H05B 6/72
(52) U.S. Cl. ...................... 219/679; 219/748; 219/738; 204/157.43; 422/21
(58) Field of Search ................................. 219/679, 686, 219/704, 705, 707, 710, 711, 691, 692, 693, 745, 746, 748, 756, 699, 738, 741; 204/157.43; 422/21, 81.12, 81.13

(56) References Cited

U.S. PATENT DOCUMENTS

| | | | |
|---|---|---|---|
| 2,612,596 A | * | 9/1952 | Gross ........................ 219/745 |
| 2,704,802 A | | 3/1955 | Blass et al. |
| 3,210,511 A | | 10/1965 | Smith |
| 3,377,564 A | | 4/1968 | Stecca et al. |
| 3,573,680 A | | 4/1971 | Carignan |
| 3,810,248 A | | 5/1974 | Risman et al. |
| 3,823,295 A | | 7/1974 | Simon et al. |
| 3,843,862 A | | 10/1974 | Staats et al. |
| 3,851,271 A | | 11/1974 | Cooke et al. |
| 3,855,440 A | | 12/1974 | Staats et al. |
| 3,927,347 A | | 12/1975 | Farney |
| 4,019,009 A | | 4/1977 | Kusunoki et al. |
| 4,028,651 A | | 6/1977 | Leetmaa |
| 4,065,654 A | | 12/1977 | Moore |
| 4,133,997 A | | 1/1979 | Thuleen |
| 4,187,405 A | | 2/1980 | Puschner et al. |

(List continued on next page.)

FOREIGN PATENT DOCUMENTS

| | | | | |
|---|---|---|---|---|
| EP | 0 410 306 A2 | | 1/1991 | |
| EP | 0 563 359 | * | 10/1993 | ................. 219/691 |
| JP | 05 345982 A | | 12/1993 | |
| JP | 6-96856 | * | 4/1994 | ................. 219/679 |
| JP | 11 243000 A | | 12/1999 | |

OTHER PUBLICATIONS

Raner, Kevin D. et al.; *A New Microwave Reactor for Batchwise Organic Synthesis*; The Journal of Organic Chemistry, American Chemical Society, Easton, U.S.; vol. 60, No. 8, pp. 2456–2460.

*Primary Examiner*—Philip H. Leung
(74) *Attorney, Agent, or Firm*—Summa & Allan, P.A.

(57) ABSTRACT

An instrument is disclosed for microwave-assisted chemical processes that avoids tuning discrepancies that otherwise result based upon the materials being heated. The instrument includes a source of microwave radiation, a waveguide in communication with the source, with at least a portion of the waveguide forming a cylindrical arc, a cylindrical cavity immediately surrounded by the cylindrical arc portions of the waveguide, and at least three slotted openings in the circumference of the circular waveguide that provide microwave communication between the waveguide and the cavity.

19 Claims, 14 Drawing Sheets

U.S. PATENT DOCUMENTS

| | | | |
|---|---|---|---|
| 4,251,787 A | 2/1981 | Young et al. | |
| 4,354,083 A | 10/1982 | Staats | |
| 4,410,865 A | 10/1983 | Young et al. | |
| 4,458,126 A | 7/1984 | Dills et al. | |
| 4,518,932 A | 5/1985 | Pickering | |
| 4,670,404 A | 6/1987 | Swift et al. | |
| 4,673,894 A | 6/1987 | Rogers | |
| 4,677,403 A | 6/1987 | Kich | |
| 4,693,867 A * | 9/1987 | Commarmot et al. | 422/64 |
| 4,700,146 A | 10/1987 | Barton | |
| 4,851,631 A | 7/1989 | Wendt | |
| 4,882,286 A | 11/1989 | Neas et al. | |
| 4,965,540 A | 10/1990 | Sullivan | |
| 5,108,701 A | 4/1992 | Zakaria et al. | |
| 5,191,182 A | 3/1993 | Gelorme et al. | |
| 5,246,674 A | 9/1993 | Katschnig et al. | |
| 5,294,895 A | 3/1994 | Feeney et al. | |
| 5,304,766 A | 4/1994 | Baudet et al. | |
| 5,320,804 A | 6/1994 | Zakaria et al. | |
| 5,344,493 A * | 9/1994 | Jackson | 204/158.2 |
| 5,418,510 A | 5/1995 | Gray | |
| 5,420,401 A * | 5/1995 | Jacquault et al. | 219/746 |
| 5,426,402 A | 6/1995 | Mariani | |
| 5,481,233 A | 1/1996 | Manolache et al. | |
| 5,552,112 A | 9/1996 | Schiffmann et al. | |
| 5,691,677 A | 11/1997 | De Maron et al. | |
| 5,731,750 A | 3/1998 | Tatomir et al. | |
| 5,777,534 A | 7/1998 | Harrison | |
| 5,796,080 A | 8/1998 | Jennings et al. | |
| H1758 H | 11/1998 | Malouf et al. | |
| 5,932,075 A | 8/1999 | Strauss et al. | |
| 5,981,924 A * | 11/1999 | Lautenschlager | 219/685 |
| 5,986,526 A | 11/1999 | Kopal et al. | |
| 5,998,774 A * | 12/1999 | Joines et al. | 219/745 |
| 6,057,645 A | 5/2000 | Srivastava et al. | |
| 6,084,226 A * | 7/2000 | Greene et al. | 219/718 |
| 6,092,924 A | 7/2000 | Scalese et al. | |
| 6,097,263 A | 8/2000 | Mueller et al. | |
| 6,175,104 B1 | 1/2001 | Greene et al. | |
| 6,258,329 B1 * | 7/2001 | Mutterer et al. | 219/686 |

\* cited by examiner

MICROWAVE-ASSISTED CHEMICAL SYNTHESIS INSTRUMENT WITH FIXED TUNING

CROSS REFERENCE TO RELATED APPLICATIONS

This application is a continuation of Ser. No. 09/773,846 filed Jan. 31, 2001. This application is related to copending applications Ser. Nos. 10/063,628 filed May 3, 2002 and 10/063,914 filed May 23, 2002.

BACKGROUND OF INVENTION

The present invention relates to microwave-assisted chemistry, and in particular relates to a microwave instrument that offers particular advantages useful for chemical synthesis reactions.

The present invention relates to devices and methods for microwave-assisted chemistry. As generally recognized in the chemical arts, many chemical reactions can be initiated or accelerated by increasing the temperature—i.e. heating— the reactants. Accordingly, carrying out chemical reactions at elevated (i.e., above ambient) temperatures is a normal part of many chemical processes.

For many types of chemical compositions, microwave energy provides an advantageous method of heating the composition. As is well recognized in the art, microwaves are generally categorized as having frequencies within the electromagnetic spectrum of between about 1 gigahertz and 1 terahertz, and corresponding wavelengths of between about 1 millimeter and 1 meter. Microwaves tend to react well with polar molecules and cause them to rotate. This in turn tends to heat the material under the influence of the microwaves. In many circumstances, microwave heating is quite advantageous because microwave radiation tends to interact immediately with substances that are microwave-responsive, thus raising the temperature very quickly. Other heating methods, including conduction or convection heating, are advantageous in certain circumstances, but generally require longer lead times to heat any given material.

In a similar manner, the cessation of application of microwaves causes an immediate corresponding cessation of the molecular movement that they cause. Thus, using microwave radiation to heat chemicals and compositions can offer significant advantages for initiating, controlling, and accelerating certain chemical and physical processes.

In recent years, much interest in the fields of chemical synthesis and analysis has focused upon the use, synthesis or analysis of relatively small samples. For example, in those techniques that are generally referred to as "combinatorial" chemistry, large numbers of small samples are handled (e.g., synthesized, reacted, analyzed, etc.) concurrently for the purpose of gathering large amounts of information about related compounds and compositions. Those compounds or compositions meeting certain threshold criteria can then be studied in more detail using more conventional techniques.

Handling small samples, however, tends to present difficulties in conventional microwave-assisted instruments. In particular, small masses of material are generally harder to successfully affect with microwaves than are larger masses. As known to those of ordinary skill in this art, the interaction of microwaves with responsive materials is referred to as "coupling." Thus, stated differently, coupling is more difficult with smaller samples than with larger samples.

Furthermore, because of the nature of microwaves, specifically including their particular wavelengths and frequencies, their interaction with particular samples depends upon the cavity into which they are transmitted, as well as the size and type of the sample being heated.

Accordingly, in order to moderate or eliminate coupling problems, conventional microwave techniques tend to incorporate a given cavity size, a given frequency, and similarly sized samples. Such techniques are useful in many circumstances and have achieved wide acceptance and use. Nevertheless, in other circumstances when one of these parameters—sample size, material, microwave frequency— is desirably or necessarily changed, the cavity typically has to be re-tuned in order to provide the appropriate coupling with the differing loads. Stated somewhat differently, and by way of illustration rather than limitation, in a conventional device a one gram load would require tuning different from a ten gram load, and both of which would require different tuning from a hundred gram load, and all of which would differ if the microwave frequency or type of material is changed.

As another issue, differently-sized samples are generally most conveniently handled in reaction vessels that are proportionally sized based on the size of the sample. Many instruments for microwave-assisted chemistry, however, are—for logical reasons in most cases—made to handle vessels of a single size; e.g. instruments such as described in U.S. Pat. No. 5,320,804 or open vessels as described in U.S. Pat. No. 5,796,080. Thus although such instruments are valuable for certain purposes, the are generally less convenient, and in some cases quite ineffective for samples, vessels, and reaction other than a certain size (volume) or type.

As yet another issue, many reactions proceed more favorably under increased (i.e . above atmospheric) pressure. Controlling and using increased pressures for small samples in microwave-assisted chemistry can, for the reasons stated above and others, be somewhat difficult.

Accordingly, the need exists for new and improved instruments for microwave assisted chemistry that can handle small samples, can conveniently handle a variety of sample sizes and vessel sizes and that can incorporate and handle higher pressure reactions when desired or necessary.

SUMMARY OF INVENTION

Therefore, it is an object of the invention to provide a microwave instrument suitable for chemical synthesis and related reaction and that can handle small samples, can conveniently handle a variety of sample sizes and vessel sizes and that can incorporate and handle higher pressure reactions when desired or necessary.

The invention meets this object with an instrument for microwave-assisted chemical processes that avoids tuning discrepancies that otherwise result based upon the materials being heated. The instrument comprises a source of microwave radiation a waveguide in communication with the source, with at least a portion of the waveguide forming a cylindrical arc, a cylindrical cavity immediately surrounded by the cylindrical arc portions of the waveguide, and at least 3 slotted openings in the circumference of the circular waveguide that provide microwave communication between the waveguide and the cavity.

In another aspect the invention is a method of conducting organic synthesis reactions comprising applying microwave radiation to a sample using a frequency to which the sample (solvent, etc) will thermally respond, and optimizing the coupling between the applied microwaves and the (load) sample without adjusting the physical dimensions of the cavity, without physical movement of the cavity (i.e. no tuning screws), without physical movement of the position of the sample and without adjusting the frequency of the applied microwaves as the sample heats and as the reaction proceeds.

In another aspect, the invention is a pressure-measuring vessel system for microwave assisted chemical processes. In this aspect, the invention comprises a pressure resistant vessel (i.e., it resists the expected pressure to which it is expected to be exposed) that is otherwise transparent to microwave radiation, a pressure-resistant closure for the mouth of the vessel, with portions of the closure including a pressure resistant synthetic membrane, a pressure transducer external to the vessel, and a tube extending from the transducer, through the membrane and into the vessel for permitting the pressure inside the vessel to be applied against the transducer while the closure and membrane otherwise maintain the pressure resistant characteristics of the vessel.

In another aspect, the invention is an instrument for microwave-assisted chemical processes that provides greater flexibility in carrying out microwave-assisted chemistry under varying conditions. In this aspect, the instrument comprises a source of microwave radiation, a cavity in communication with the source, with the cavity including at least one wall formed of two engaged portions that form a barrier to the transmission of microwaves when so engaged, with the engaged portions being disengagable from one another; and with one of the portions further including a microwave-attenuating opening for receiving a reaction vessel therethrough and into the cavity when the portions are engaged.

In yet another aspect, the invention is a method of increasing the efficiency of microwave-assisted chemical reactions. The method comprises carrying out a first chemical reaction in a reaction vessel in an attenuated cavity of a microwave instrument, removing the reaction vessel and the attenuator from the instrument, placing a different reaction vessel and a differently-sized attenuator in the same cavity of the instrument, and carrying out a second chemical reaction in the different vessel in the cavity of the instrument.

The foregoing and other objects and advantages of the invention and the manner in which the same are accomplished will become clearer based on the followed detailed description taken in conjunction with the accompanying drawings.

DETAILED DESCRIPTION

Figure 1:
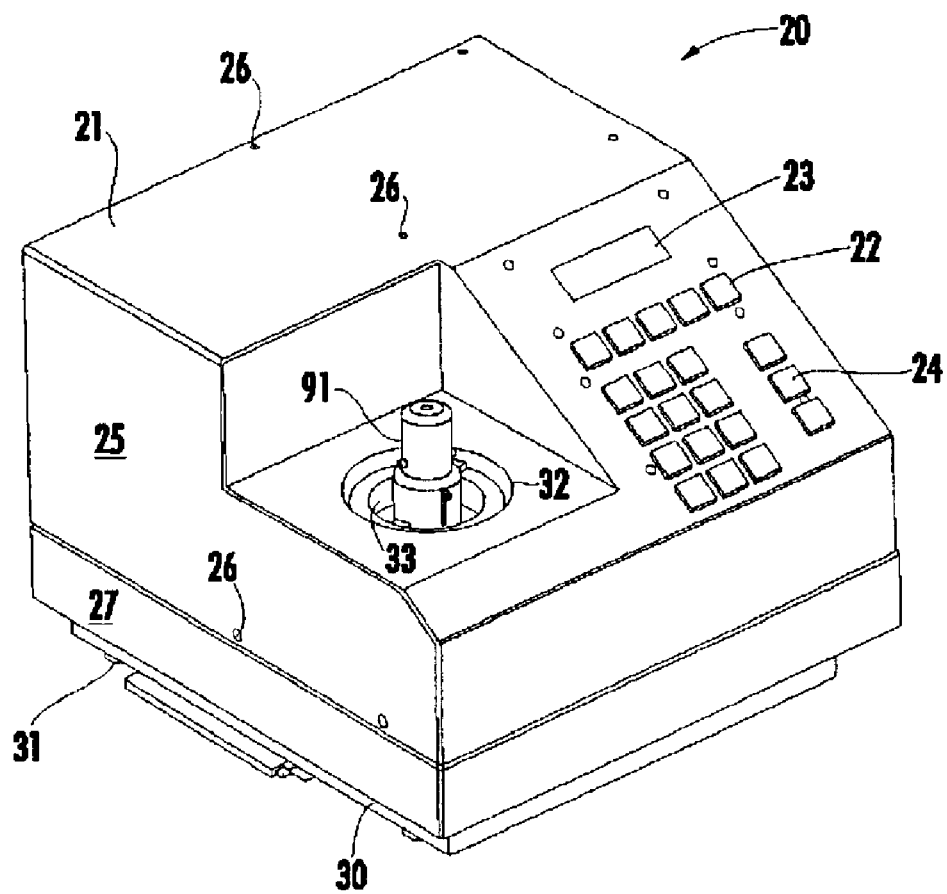
FIG. 1 is a front perspective view of an instrument according to the present invention.

An embodiment of the present invention is illustrated in perspective view in FIG. 1 with the instrument broadly designated at 20. Most of the other details of the invention will be shown in other drawings, but FIG. 1 illustrates that the instrument 20 includes a housing 21, a control panel 22, and a display 23. As will be discussed later herein, the control panel 22 can be used to provide the instrument with a variety of information that may relate to the chemical processes being carried out, or to set or define certain parameters, such as maximum pressure or temperature during the application of microwave energy to a particular reaction. The control panel 22 can be formed of any type of appropriate input devices, with buttons 24 being illustrated. It will be understood, however, that other types of input devices, including touch screens, keyboards, a computer "mouse" or other input connections from computers or personal digital assistants can also be used in any appropriate fashion known to those of skill in this art that does not otherwise interfere with the operation of the instrument. Similarly, the display 23 is most commonly formed of a controlled or addressable set of liquid crystal displays (LCDs) but can also comprise a cathode ray tube (CRT), light emitting diodes (LEDs), or any other appropriate display medium.

The housing 27 includes a removable upper portion 25, attached by appropriate fasteners 26 (screws or Allen nuts are exemplary) to a lower housing portion 27 and a pedestal portion 30, which in turn are supported by the pedestal feet 31.

FIG. 1 also illustrates that the housing 21 includes an opening 32, which provides access to the microwave cavity in a manner that will be described with respect to other drawings. As FIG. 1 illustrates, the opening 32 provides much easier access for placing samples into the cavity than in many other types of microwave instruments.

FIG. 1 also illustrates the sample holder and microwave attenuator assembly 33, and a collet assembly 91 which will likewise be described in more detail with respect to other of the drawings.

Figure 2:
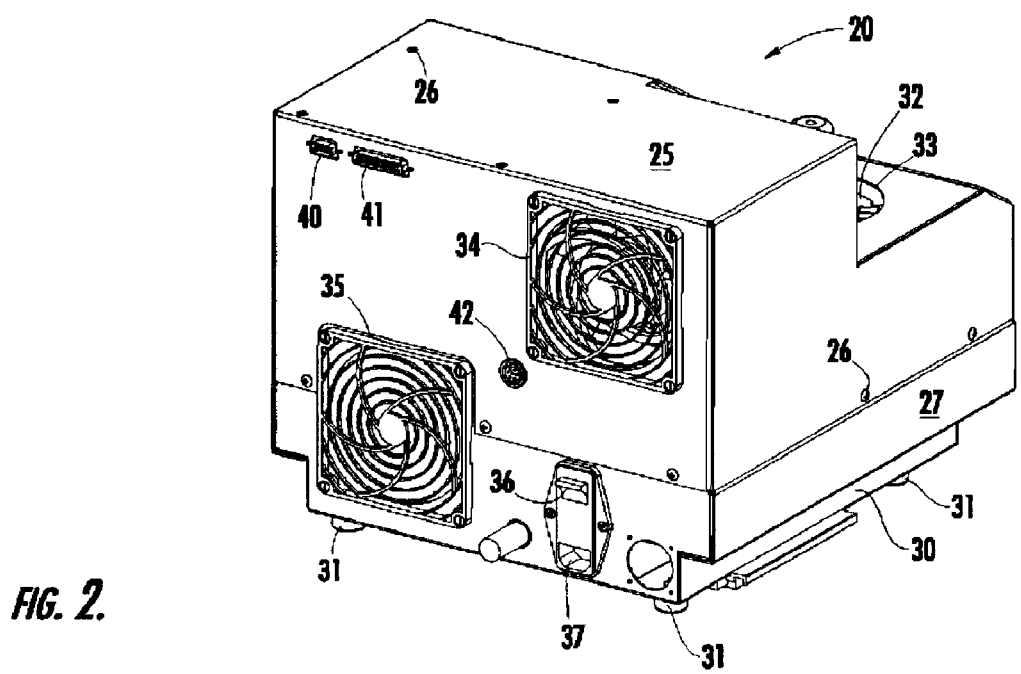
FIG. 2 is a rear perspective view of the instrument illustrated in FIG. 1.

FIG. 2 is a rear perspective view of an instrument according to the present invention that illustrates some additional items. As in FIG. 1, FIG. 2 illustrates the upper housing portion 25, the lower housing portion 27, the fasteners 26, the pedestal portion 30, the feet 31, the sample holder and attenuator assembly 33 and the opening 32 in the housing 25 that provides access to the cavity.

Additionally, FIG. 2 illustrates that the device includes at least one cooling fan 34 with a second being shown at 35. The fans 34 and 35 serve to cool the electronics and the magnetron portions of the device, as well as helping to keep the cavity from, becoming overheated in the presence of ongoing chemical reactions. Other than having the capacity to appropriately cool the instrument and the cavity, the nature or selection of the fans can be left to the individual discretion of those with skill in this art.

FIG. 2 also shows the power switch 36 and the power cord inlet 37. In order to take advantage of the full capacity of the instrument, in preferred embodiments, the instrument includes the parallel port 41 and the serial port 40 for receiving input from or providing output to other electronic devices, particularly microprocessor based devices, such as personal computers, personal digital assistants or other appropriate devices. Similarly, FIG. 2 illustrates a connector 42 for the pressure transducer to be described later herein.

Figure 3:
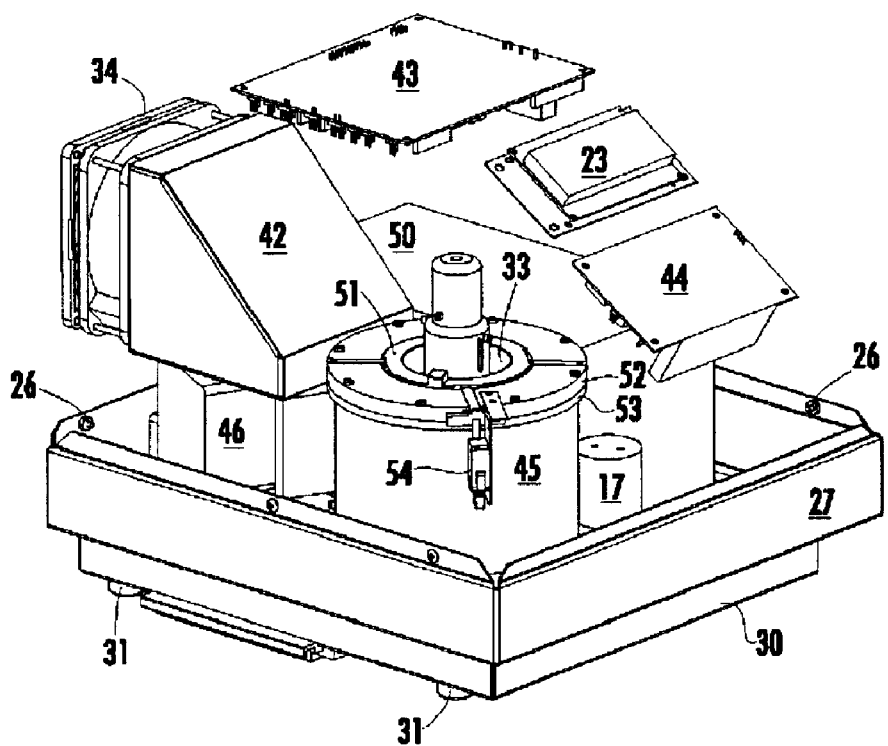
FIG. 3 is a partially exploded interior view of the instrument illustrated in FIGS. 1 and 2.

FIG. 3 is a partially exploded view of the interior of an instrument 20 according to the present invention. In common with FIGS. 1 and 2, the lower portion 27 of the housing and the pedestal portion 30 of the housing are both illustrated along with the pedestal feet 31. FIG. 3 also illustrates several of the fasteners 26, as well as the fan 34 along with its housing 42.

FIG. 3 shows the display 23 in exploded fashion along with a first electronics board 43 and a second electronics board 44. Basically, the electronics carried by the boards 43 and 44 are generally well understood in their nature and operation. With respect to the instrument of the present device, the electronics first control the power from a given source, usually a wall outlet carrying standard current. The electronics also control the operation of the device in terms of turning the magnetron on or off, and in processing information received from the ongoing chemical reaction, in particular temperature and pressure. In turn, the appropriate processor is used to control the application of microwaves, including starting them, stopping them, or moderating them, in response to the pressure and temperature information received from the sensors described later herein. The use of processors and related electronic circuits to control instruments based on selected measured parameters (e.g. temperature and pressure) is generally well understood in this and related arts. Exemplary (but not limiting) discussions include Dorf, The Electrical Engineering Handbook, Second Ed. (1997) CRC Press LLC.

In the embodiment illustrated in FIG. 3, the outer housing of the cavity is visible at 45, along with the housing portions of the microwave source, illustrated as the magnetron 46. FIG. 3 also illustrates the sample holder and attenuator assembly 33, and a motor 47 for stirring reactants in a manner described later herein. FIG. 3 also illustrates the housing 50 for the second fan 35 present in the illustrated embodiment. Because the sample vessel (not shown) and the sample holder and attenuator assembly 33 are generally quite different in size than the cavity itself, FIG. 3 illustrates that the attenuator 33 according to the present invention further includes an upper rim 57 into which lower portions of the sample holder and attenuator assembly 33 can rest in a changeable receiving fashion. The features, advantages and details of the attenuator 33 are discussed in more detail with respect to FIGS. 11, 12, and 13. The attenuator 33 is in turn held in place by a pair of retaining rings 52 and 53 into which the attenuator 33 is received and which is also held in place by the interlock assembly broadly designated at 54.

Figure 4:
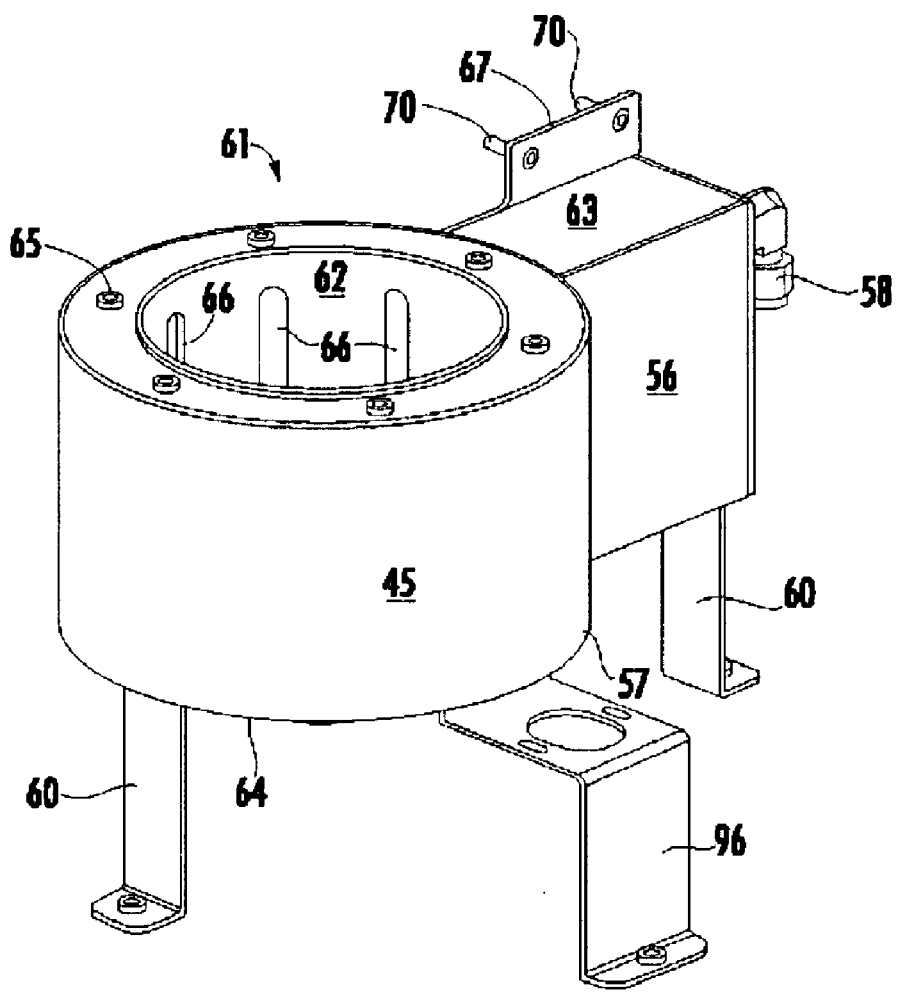
FIG. 4 is a perspective view of a cavity and wave-guide according to the present invention.
Figure 5:
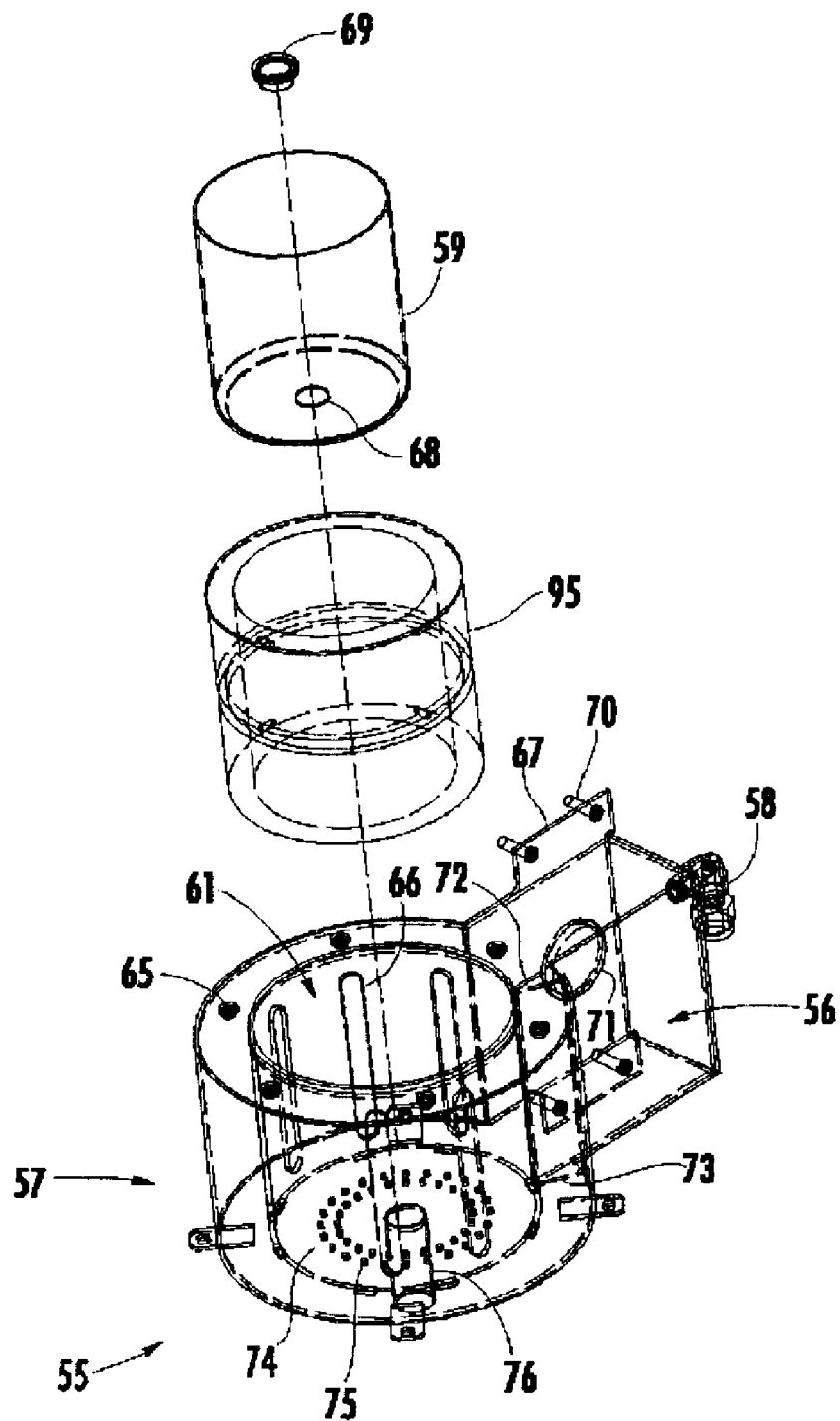
FIG. 5 is an interior view of the waveguide and cavity illustrated in FIG. 4.

FIGS. 4 and 5 illustrate aspects of the waveguide and cavity portions of the instrument according to the present invention. In these illustrations, the waveguide is broadly designated at 55, and includes both a parallelpiped rectangular portion 56, and a cylindrical portion 57 that in preferred embodiments has a rectangular cross section. In the illustrated embodiment, the waveguide 55 is supported on a series of legs 60 which serve to position the cavity 61 and waveguide 55 in communication with the magnetron 46 and the other elements within the particular housing 21. One of the legs, designated at 96, has a slightly different structure to support the motor 47 (not shown). It will be understood, of course, that such features as the leg 60 which merely positions the waveguide within a particular embodiment are not limiting of the present invention. In preferred embodiments the rectangular or parallelpiped portion 56 of the waveguide joins the cylindrical portion 57 perpendicularly to a tangent defined by the circumference of the cylindrical waveguide portion 57.

FIGS. 4 and 5 also illustrate the cavity as broadly designated at 67. In particular, the cavity is formed by an inner cylindrical wall 62 that forms a concentric cylinder inwardly of the cylindrical cavity housing 45. An upper waveguide plate 63 and a lower waveguide plate 64 define the limits of the waveguide 55 in both its rectangular portion 56 and its cylindrical portion 57. The waveguide 55 is constructed of a material that reflects microwaves inwardly and prevents them from escaping in any undesired manner. Typically, such material is an appropriate metal which, other than its function for confining microwaves, can be selected on the basis of its cost, strength, formability, corrosion resistance, or any other desired or appropriate criteria. In preferred embodiments of the invention, the metal portions of the waveguide and cavity are formed of stainless steel.

The top plate 63 (as well as the bottom plate 64) is also held in place by a series of connectors 65 which can be rivets, screws or nuts, provided that their size and shape avoids undesired interference with the microwaves in the cylindrical or other portions of the waveguide 55.

Perhaps most importantly, FIG. 4 illustrates that a plurality of slotted openings 66 are present in the inner cavity wall 62 for facilitating the transmission of microwaves from the waveguide 55 into the cavity 61. It will be understood that because the inner wall 62 defines the border of the waveguide 55 and the cavity 67, the slotted openings 66 can also be described as being in the inner circumference of the cylindrical portion 57 of the waveguide.

hereherein particular, it has been discovered in accordance with the present invention that a plurality of such slots in a circular orientation in a static structure in the cavity 61 provides an appropriate amount of coupling with a wide variety of sample sizes or types that may be present in the cavity. Although the inventors do not wish to be bound by any particular theory, it appears that the plurality of slots 66, permit a variety of microwave patterns (modes) to be established in the cavity 61, depending upon the load to which the microwaves are coupled. The cavity includes at least three slots, preferably at least five, and in the presently most preferred embodiment includes seven slots spaced at least about 40 degrees from each other. Preferably, the slots 66 are oriented parallel to the axis of the cavity 61.

As other details, FIG. 4 illustrates a connector plate 67 and connecting pins 70 are at one end of the waveguide 55 for connecting the waveguide 55 to the magnetron 46 or other microwave source, which can, depending upon choice and circumstances, also comprise klystron, a solid state device, or any other appropriate device that produces the desired or necessary frequencies of electromagnetic radiation within the microwave range. FIG. 4 also shows a gas inlet fitting 58 that is part of a system for cooling the cavity that is discussed in more detail with respect to FIGS. 10, 12 and 13.

As some additional details, in the preferred embodiments, the cylindrical, waveguide completes an arc of more than 180°, and preferably between 270° and 360°, and the cylindrical cavity 67 completes a full 360°.

FIG. 5 shows the same details as FIG. 4, but in a broken line interior view. Accordingly, FIG. 5 likewise illustrates the overall structure of the waveguide 55, its rectangular and cylindrical portions 56 and 57 respectively, the cavity 67, the slots 66 in the inner wall 62, and the supporting legs 60. FIG. 5 also illustrates that the fasteners 65 have a relatively low profile within the waveguide 55 to avoid interfering with microwave propagation therethrough.

In particular detail, FIG. 5 shows that the waveguide 55 is connected to the magnetron 46 (not shown) through the launching opening 71 in the plate 67. The microwaves can then propagate through the rectangular portion of the waveguide 56 into the circular portion 57 of the waveguide 55. The structure also includes two walls 72 and 73 that are positioned in the cylindrical portion 57 of the waveguide just adjacent one of the places where it intersects with the rectangular portion 56. Accordingly, to the extent that standing waves or modes are in the waveguide 55 and cavity 67, they will be confined to the illustrated geometry by the reflecting wall 73. In the absence of the walls 72 or 73, the modes in the waveguide and the cavity 67 would be quite different because they would interact through a full 360° of the waveguide housing rather than in the somewhat lesser portion than they do in the illustrated embodiment.

FIG. 5 also shows that in the preferred embodiment of the present invention there are seven slots 66 in the inner cavity wall 62, with each of the slots being at least about 40 degrees apart from each of the next adjacent slots. Furthermore, none of the slots 66 are directly at the end of the rectangular portion 56 of the waveguide 55 so that the modes that set themselves up in the waveguide 55 and cavity 67 must enter the cavity 61 after having entered at least a portion of the cylindrical portion 57 of the waveguide 55.

FIG. 5 also illustrates that in preferred embodiments, the cavity floor 74 includes a plurality of small openings 75 for ventilation and fluid drainage purposes, with ventilation being expected and liquid drainage being less frequent, typically in the case of spills. FIG. 5 also illustrates a circular shaft 76 that depends from the floor 74 of the cavity 61 for permitting optical access to the cavity in a manner that will be described later herein.

Alternatively, FIG. 5 also illustrates the optional use of a cavity liner 59 for containing spills, splashes or other incidents in the cavity 61. The cavity liner 59 optionally includes a small opening 68 to facilitate optical temperature measurement through the opening 76 in the cavity floor 74 and the window 69. If the cavity liner 59 is formed of a material that is transparent to the optical measurement (typically IR-transparent for IR temperature measurements), the window 69 may be unnecessary. The liner 59 is preferably formed of a chemically-resistant polymer, and can (depending on the user's cost and benefits) provide a disposable alternative to physically cleaning reagents or by-products from the cavity 61.

Figure 10:
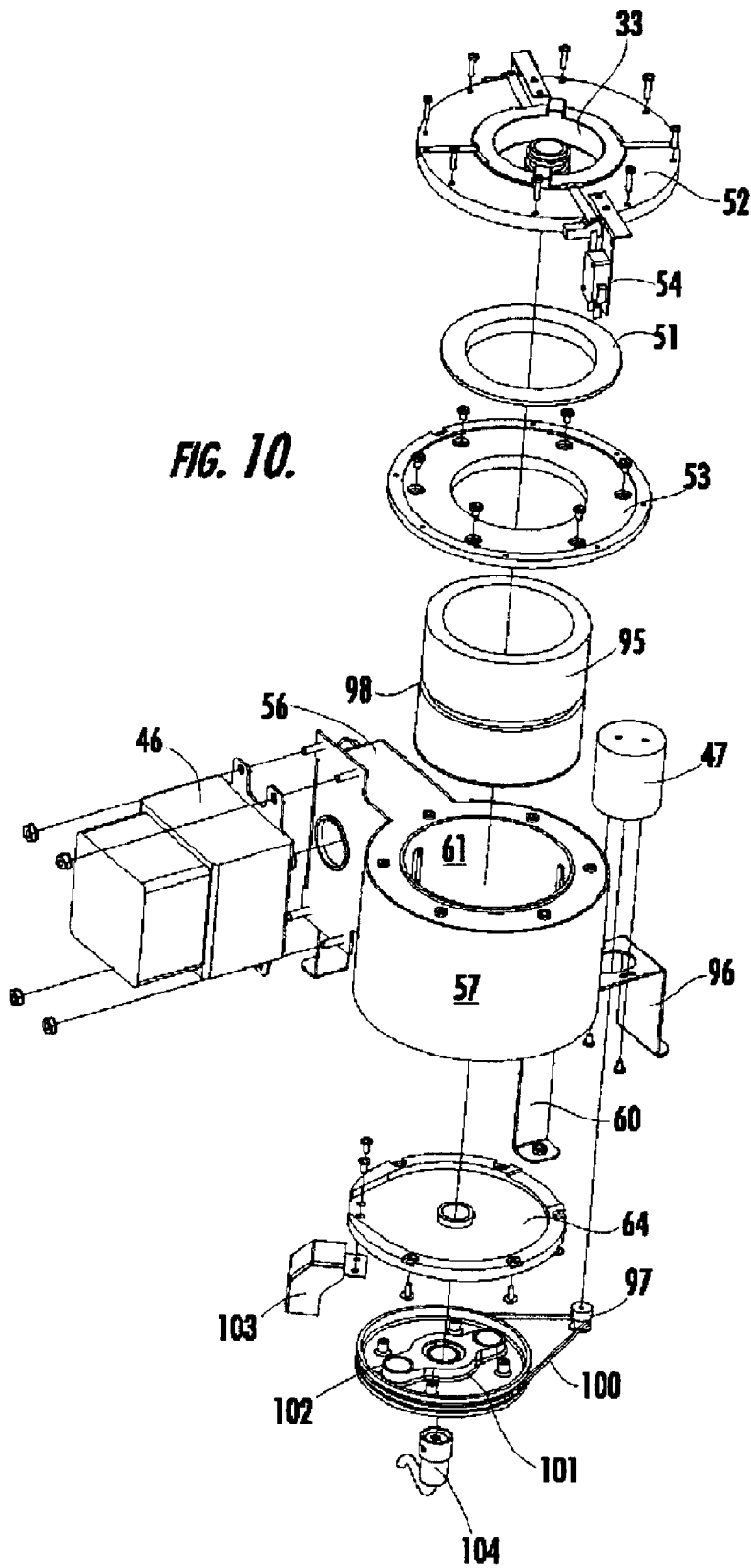
FIG. 10 is an exploded view of the cavity assembly of an instrument according to the present invention.

FIG. 5 also illustrates the dielectric insert 95 that is described in more detail with respect to FIG. 10.

Figure 6:
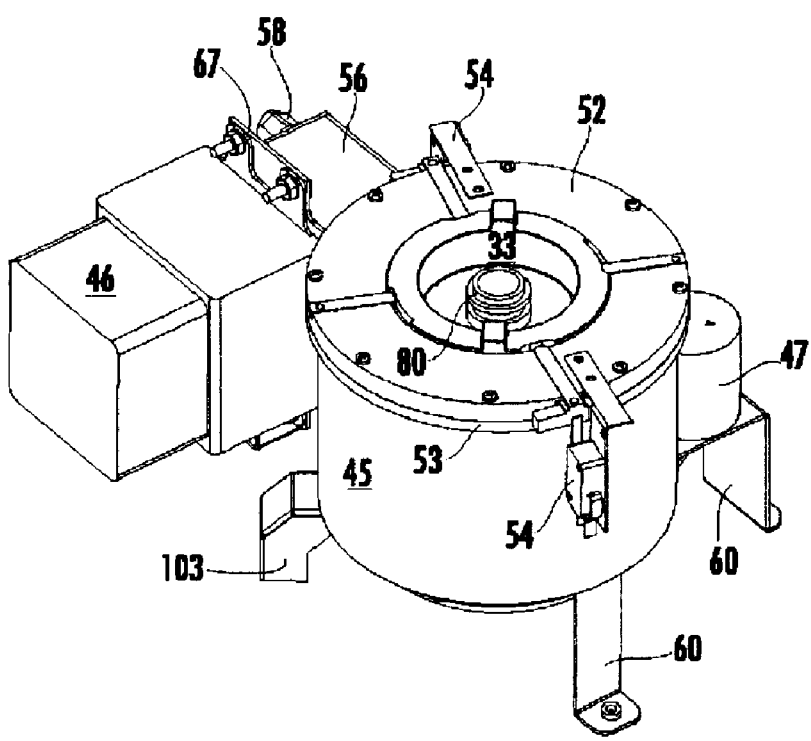
FIG. 6 is a perspective exterior view of the wage guide, cavity and magnetron of the present invention.

FIG. 6 is a complementary view of a number of the elements of the invention and illustrates the cavity 61 from the perspective of its housing 45 in conjunction with the rectangular portion 56 of the waveguide 55 and the magnetron 46. In particular, FIG. 6 offers a larger view of the retaining rings 52 and 53 along with the removable attenuator 33. The attenuator 33 includes an axial opening that will be described in more detail with respect to FIGS. 12 and 13. As described with respect to FIG. 3, the retaining rings and the attenuator 33 are held in place by the interlock assemblies 54. One of the particular advantages of the invention is that with the use of the retaining rings 52 and 53, along with the interlock assembly 54 to retain the attenuator 33 in place, the interlock assembly 54 can be relatively easily released, and the attenuator 33 replaced with one that contains a different sized opening that in turn supports a different size reaction vessel while still preventing microwaves from propagating past the attenuator 33.

Thus, the retaining rings 52 and 53, along with the engaged attenuator 33 form the upper horizontal wall of the cavity and a barrier to the transmission of microwaves when so engaged. The retaining rings 52 and 53 are fixed to the cavity ( i.e., removable only by disassembling the instrument with tools), while the attenuator 33 is easily removable from the rings 52 and 53 with a simple turning and lifting movement. The removable attenuator 33 includes the microwave attenuating opening 118 (FIGS. 12 and 13) for receiving a reaction vessel therethrough, and into the cavity 61. It will thus be understood that in preferred embodiments, the instrument comprises two or more of the removable and engagable attenuators 33 that have differently-sized (from one another) microwave-attenuating openings for receiving differently-sized reaction vessels.

Figure 7:
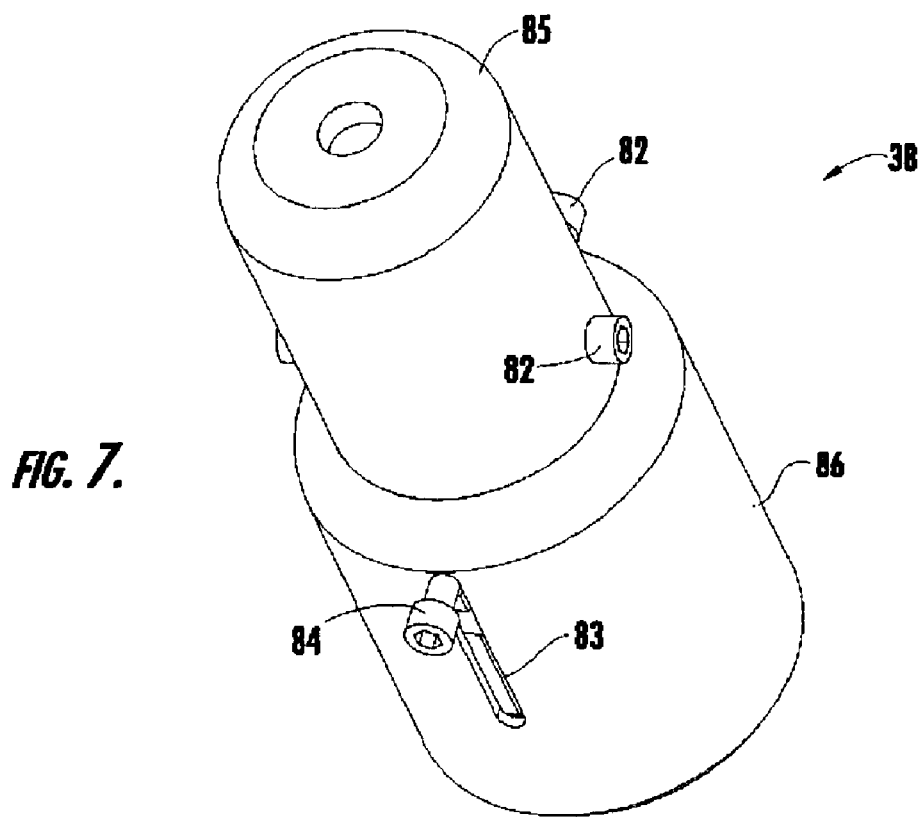
FIG. 7 is a perspective view of the pressure-measuring assembly according to the present invention.
Figure 8:
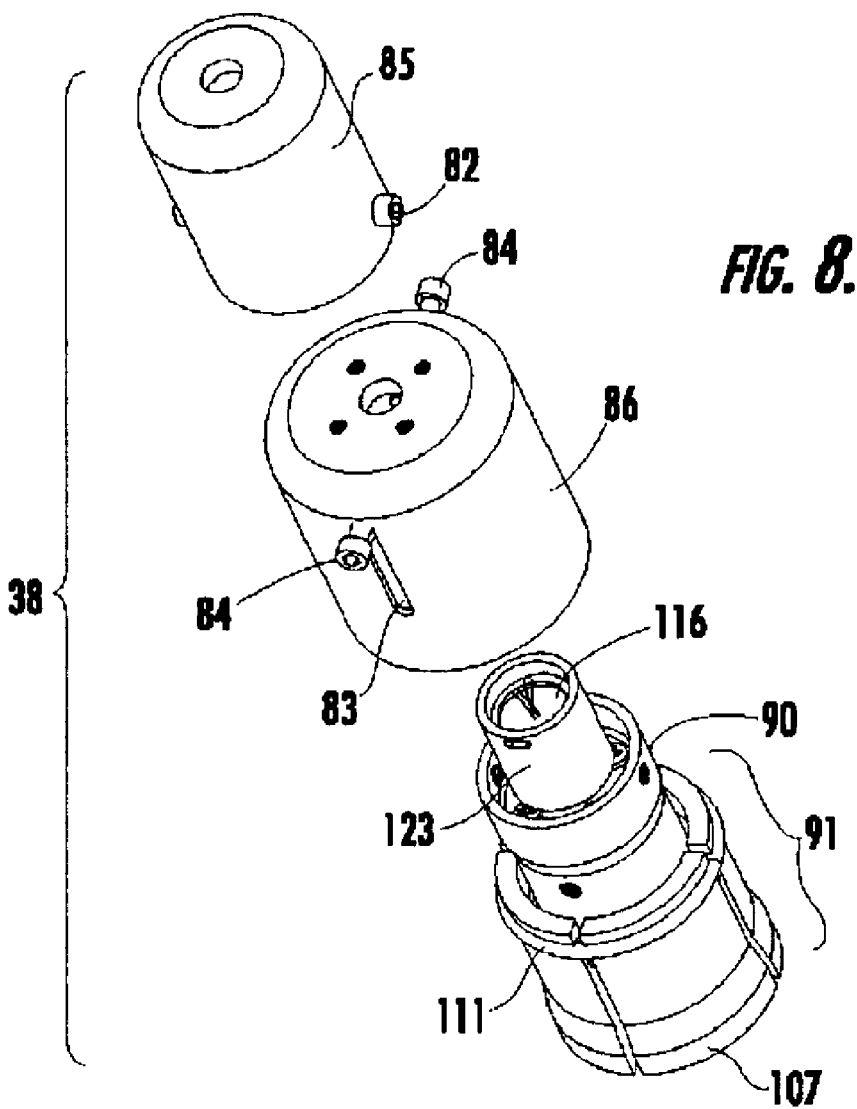
FIG. 8 is another perspective view of the pressure-measuring assembly.
Figure 9:
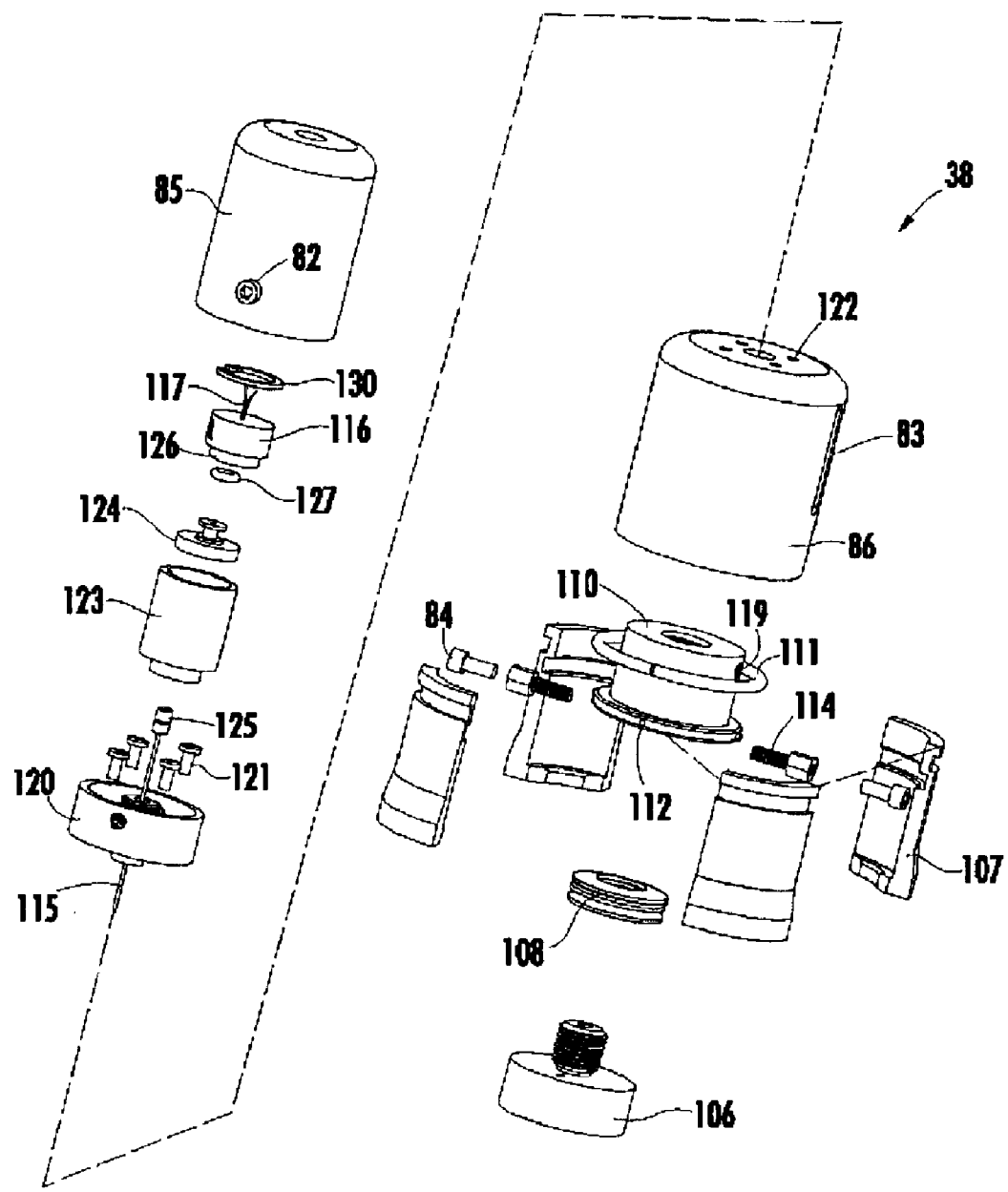
FIG. 9 is a detailed exploded view of the pressure measuring assembly.

FIGS. 7, 8, and 9 illustrate detailed aspects of the pressure measuring means of the instrument including the transducer assembly 38. FIG. 7 shows the assembly 38 in assembled fashion with a series of retaining screws 82, a collet adjustment slot 83, and a collet tension screw 84 all of which are perhaps best understood with respect to FIG. 9.

FIG. 8 shows the backshell of the assembly 38, apart from the collet housing 86 which includes the retaining screws 82 that are also illustrated in FIG. 7. A pressure transducer 116 is positioned inside a transducer holder 123 which in turn is surrounded by the adjustable collet assembly 91, the details of which are best illustrated in FIG. 9.

FIG. 9 is an exploded view of the transducer assembly 38. As in FIGS. 7 and 8, the collet backshell is illustrated at 85, and the collet housing at 86. The setscrews 82 illustrated in FIGS. 7 and 8 are also illustrated in FIG. 9.

Figure 11:
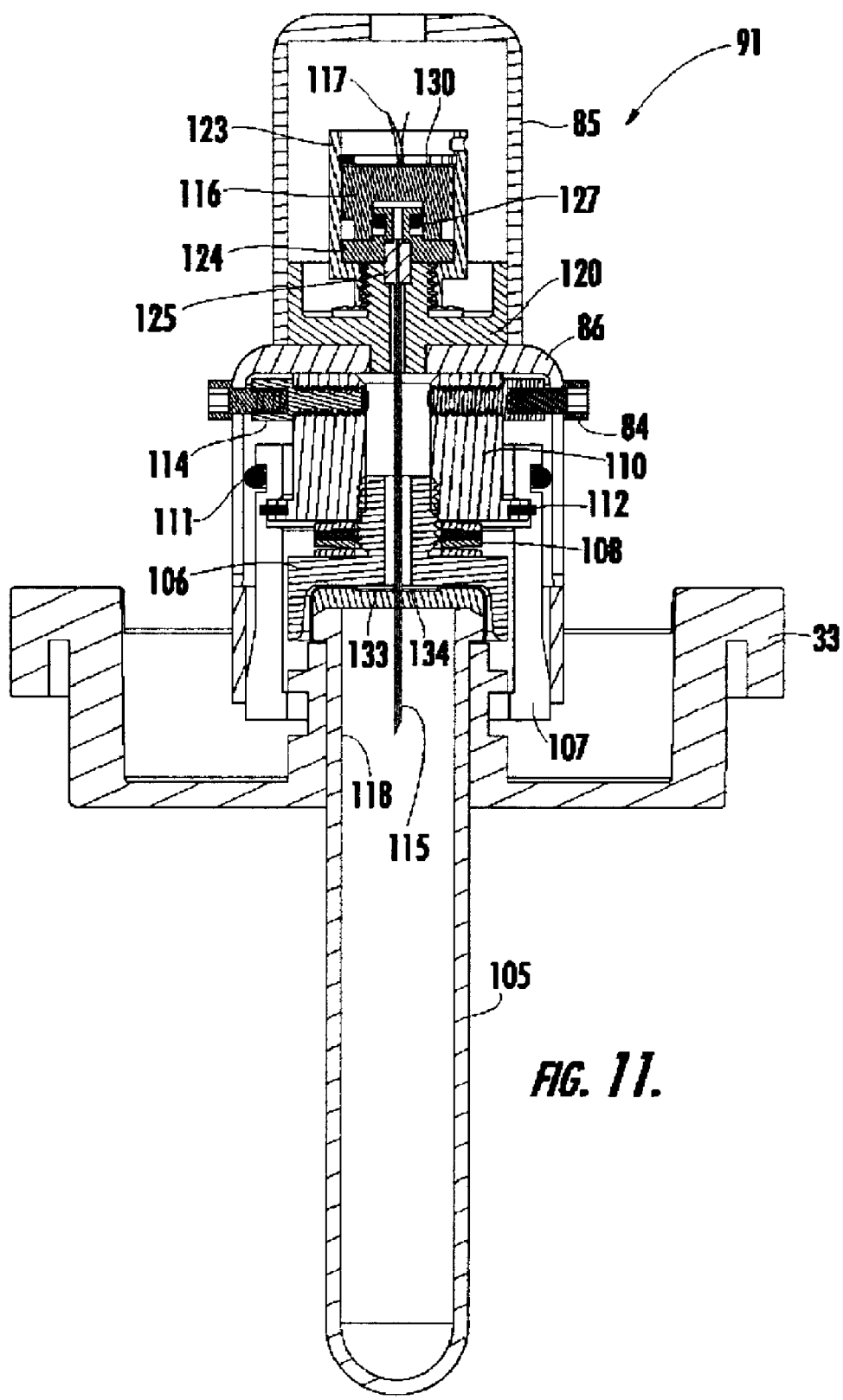
FIG. 11 is a cross-sectional view of a reaction vessel, pressure-measuring means and collet assembly of an instrument according to the present invention.

FIG. 9 is perhaps best understood with respect to its relation to a vessel (not shown in FIG. 9) that is in the cavity 61 undergoing a microwave-assisted chemical reaction. Such a vessel, and its cap, are schematically illustrated in somewhat more detail in FIG. 11, but for the purposes of FIG. 9, it will be understood that a vessel would be positioned under and in engagement with a vessel receptor 106 that is illustrated in FIG. 9. In order to engage the entire transducer assembly 38, and in turn the pressure measuring transducer, with a vessel, the transducer assembly 38 forms an adjustable device that can move in linear relationship to its own housing 86, and with respect to a vessel in the cavity. Accordingly, and in order to accomplish this, FIG. 9 shows that the transducer assembly 38 includes a plurality (four are preferred) of collet leaves 107. The leaves 107 are held in flexible relationship to the collet trunk 110 by the garter spring 111. Among other features, the collet trunk 110 includes a plurality of pins 112. As a result, when the leaves 107 are attached to the collet trunk 110 by the garter spring 117, the leaves 107 can flex inwardly and outwardly with respect to the overall axis of the assembly 38. Each leaf 107 further includes a gripping edge 113 that engages a cap on a vessel in a manner that is illustrated in FIG. 11. FIG. 9 also shows that the retaining screws 84 are received into the threaded bolts 114. In use, the threaded bolts 114 are received into the openings 119 in the collet trunk 110 and the screws 84 are received into the threaded bolts 114 . The screws 84 can move parallel to the axis of the assembly 38 in the collet adjustment slots 83 that are also illustrated in FIGS. 7 and 8. The two-part nature of the screws 84 and 114 permit the collet 86 housing and the collet leaves 107 to be tightened in place in an appropriate relationship to a vessel as may be desired or necessary in given circumstances.

The present invention measures the pressure inside of a vessel by transmitting the pressure through a needle that extends through a septum and into the vessel to the transducer 116 that converts the pressure into an appropriate electrical signal for the processor or the display. FIG. 9 also illustrates these features in more detail as does FIG. 11. First, the needle 115 extends into the reaction vessel 105 (FIG. 11). In turn, the needle 115 transmits the pressure, in the well-understood fashion of fluid mechanics, to the transducer 116. In turn, the transducer 116 transmits its signals through the wires 117. In a typical arrangement.(and although not specifically illustrated in FIG. 9), the transducer 116 includes four wires: power and its ground, and signal and its ground.

The other elements in the left-hand portion of FIG. 9 help maintain the transducer 116 and the needle 115 in proper relationship with each other and with the vessel. Thus, FIG. 9 shows a needle holder 120, which is fixed on the collet adjustment housing 86 using the screws 121 which are respectively received in the screw holes 122 in the housing 86. The transducer 116 is received in a transducer holder 123 that also encloses a needle receptor 124 that receives the upper (cap) portion 125 of the needle 115. The transducer 116 includes a small bushing 126 that receives the needle receptor 124, with the O-ring 127 providing an additional pressure seal. The A clip ring 130 helps hold these elements together in the transducer holder 123. FIG. 9 thus illustrates that when the collet assembly and transducer assembly are properly assembled, the needle 115 passes axially through the needle holder 120, the housing 86, the collet trunk 110, and the vessel receptor 106, and into the vessel itself, thus permitting the transducer to read the pressure in the vessel as desired.

FIG. 10 illustrates additional features of the instrument of the present invention in exploded fashion. A number of the elements illustrated in FIG. 10 have already been described with respect to the other figures. These include the magnetron 46, the rectangular portion 56 of the waveguide 55, the circular portion 57, the retaining, rings 52 and 53, and the interlock assembly 54. FIG. 10 illustrates the attenuator in a resting, but not fully engaged position with respect to the retaining ring 52. A polymer bushing 57 is positioned between the retaining rings 52 and 53 and helps provide a better physical and microwave seal for the cavity 45.

FIG. 10 also illustrates a dielectric insert 95 that fits in the cavity 61 immediately adjacent the inner wall 62 of the cavity 61 . The dielectric insert 95 serves at least two purposes: first, the dielectric insert 95 is preferably formed from a chemically inert material to help protect the interior of the cavity 61 from reagents. Preferred materials include polymeric fluorinated hydrocarbons such as polytetrafluoroethylene (PTFE).

Second, the insert 95 forms a portion of a preferred system for cooling the interior of the cavity 67 during or after chemical reactions have been carried out therein and in response to the elevated temperatures generated by the reactions. In particular, in preferred embodiments, the waveguide 55 includes a gas inlet fitting (58 in FIGS. 4 and 6) through which a cooling gas can be circulated into and throughout the waveguide. In order to take advantage of this, the insert 95 includes the circumferential channel 98 through which the cooling gas can flow. A series of small, radially-oriented openings (too small to be illustrated in the scale of FIG. 10) permit the gas to flow into the center of the cavity 61 and cool it and any vessels and reagents inside. Although the insert 95 changes the tuning characteristics of the cavity, the tuning can be adjusted as desired to compensate for the insert 95. Such tuning is familiar to those of ordinary skill in this art and can be carried out without undue experimentation.

FIG. 10 also illustrates the stirring mechanics of the instrument of the present invention. As illustrated therein, the stirrer motor 47 is positioned on a motor platform leg 96 from which it drives a pulley 97. In turn, the drive pulley 97 drives a belt 100 to thereby drive the driven pulley 101. The driven pulley 101 contains one or two magnets 102, which, because of their position on the driven pulley 101, orbit the center of the bottom floor 64 of the cavity 61. When a magnetic stirrer bar is placed in a vessel in the cavity 61 and the motor 47 drives the pulleys 97 and 101, the motion of the magnets 102 will in turn drive the stirrer bar in the reaction vessel.

FIG. 10 also illustrates a liquid drain 103. The liquid (fluid) drain 103 works in conjunction with the floor openings 75 that are best illustrated in FIG. 5 to allow any fluids that may collect in the cavity 61 to drain through the openings 75 and then through the drain 103 to a collection point (not shown) which in a presently preferred embodiment comprises a small removable trough located at the floor of the instrument 20.

FIG. 10 further illustrates means for measuring the temperature of items (vessels and reagents) in the cavity, shown as the temperature measuring device 104, which is positioned immediately below and coaxially with the depending shaft 76 (FIG. 5) to thus have an optically clear view of the interior of the cavity 61 . Accordingly, when the temperature measuring device is an optical device, with an infrared sensor being preferred, it can accurately measure the temperature of vessels or contents of vessels within the cavity and provide the appropriate feedback to the processor of the instrument. As known to those familiar with such measurements, the infrared sensor 104 must be appropriately positioned and focused to record the proper temperature of the intended objects, but doing so is generally well understood by those of skill in this art and will not be otherwise described in detail. Indeed, particular and appropriate adjustments can be made on an instrument-by-instrument basis without undue experimentation.

In preferred embodiments, the temperature measuring device 104 is an infrared sensor, of which appropriate types and sources are well known by those of skill in this art. Additionally, and although not illustrated in detail in FIG. 10, the driver pulley 101 also carries an infra-red transparent window through which the sensor 104 can read the infrared transmissions from the cavity 61. In preferred embodiments, the window is formed of an amorphous composition of germanium (Ge), arsenic (As) and selenium (Se), which provides the greatest accuracy, but at a relatively high cost. Thus, in other embodiments the window can be formed of infrared-transparent polymers such as polytetrafluoroethylene (PTFE) or polypropylene which provide accurate transmission at a generally lower cost.

With respect to both pressure and temperature measurement, and the processors referred to earlier, the instrument includes the capability for moderating the application of microwave power in response to the measured temperature or pressure. The method of moderating can be selected from among several methods or apparatus. A simple well-understood technique is to carry out a simple "on-off" cycle or series of cycles ( i.e., a duty cycle). Another technique can incorporate a variable or "switching" power supply such as disclosed in commonly assigned U.S. Pat. No. 6,084,226; or techniques and devices that physically adjust the transmission of microwaves, such as disclosed in commonly assigned U.S. Pat. Nos. 5,796,080 and 5,840,583.

FIG. 11 is a cross-sectional view of the relationship between the removable attenuator 33, a reaction vessel 105, and the collet assembly 97. In a broad sense, FIG. 11 illustrates the relationship between the pressure transducer 116, the needle 115, and the closure for the vessel, which is formed of the deformable metal portion 133 and the septum 134. The relationship is such that the collet assembly 97 urges the transducer 116 and needle 115 towards the vessel 105 while concurrently bearing against the septum 134 and while urging the vessel and collet towards one another to provide the appropriate pressure seal.

By urging the various elements together in such fashion, the invention prevents the puncturable septum from becoming a weak point in the pressure integrity of the vessel 105 and the transducer 116. As well recognized in this art, many chemical reactions will generate gases and in a closed system these generated gases will cause a corresponding increase in gas pressure.

Many of the items illustrated in FIG. 11 are also illustrated in FIG. 9 and, thus, corresponding numerals will be used in each case. In more detail, the vessel 105 rests in the central opening 118 defined by the removable attenuator 33. As illustrated in FIG. 11, the vessel 105 includes an annular lip portion 109 that rests upon the inner opening 118. In order to maintain the vessel in place while measuring the temperature, the leaves 107 of the collet assembly are brought to bear against the removable attenuator 33 and, because of the threaded relationships between the vessel receptor 106, the collet trunk 110, and the collet housing 86, the collet can be brought to an appropriate position and tightened there to maintain the leaves 107 in forced contact against the removable attenuator, while at the same time urging the vessel receptor 106 downwardly against the vessel 105. In turn, the position of the collet trunk 110 with respect to the collet housing 86 can be adjusted using the collet adjustment slot 83 and the threaded nut and bolt portions 84 and 114.

Accordingly, FIG. 11 shows that when the vessel is in place in the removable attenuator 33, the collet assembly 97 can clamp it in place and at the same time maintain an appropriate pressure against the septum 134, while at the same time seating the needle 115 and its upper needle portion (cap) against the transducer in a manner which permits the pressure to be accurately measured, while at the same time maintaining the integrity of the vessel and preventing it from becoming dislodged when gases generated by the reaction increase the pressure in the vessel 105.

FIG. 11 illustrates that the reaction vessel 105 includes a closure shown as the cap assembly 132. The cap assembly 132 is, in preferred embodiments, formed of a deformable metal ring 133 and a penetrable septum 134. The septum 134 is made of a material, preferably an appropriate polymer or silicone related material, that can be penetrated by the needle 115, but which will surround and seal against the needle 175 even after penetration, thus maintaining the pressure integrity of the vessel 105.

The ring 132 is formed of a metal thick enough to have appropriate pressure resistant properties, but which can be deformed relatively easily, preferably with an ordinary clamping tool, to engage the lip portions 135 of the reaction vessel 105 and thereby seal the vessel. With the vessel so sealed by the cap assembly 132, the leaves 107 of the collet assembly 91, are brought into engagement with the attenuator 33 and the vessel 105, with the ledges or gripping edges 113 engaging the attenuator 33 in a horizontal fashion and the cap assembly 132 in a vertical fashion to help maintain the sealed integrity of the entire assembly when in use.

In this fashion, the needle 115 extends from the transducer, through the cap 132 and into the vessel 105 to provide pressure communication between the interior of the vessel 105 and the transducer 116. The collet assembly 91 engages the transducer, the needle 115, the cap 132 and the vessel 105 in linear relationship so that the pressure in the vessel 105 is transmitted to the transducer 116 while the vessel is in use (i.e., a reaction taking place while microwaves are being applied).

Figure 12:
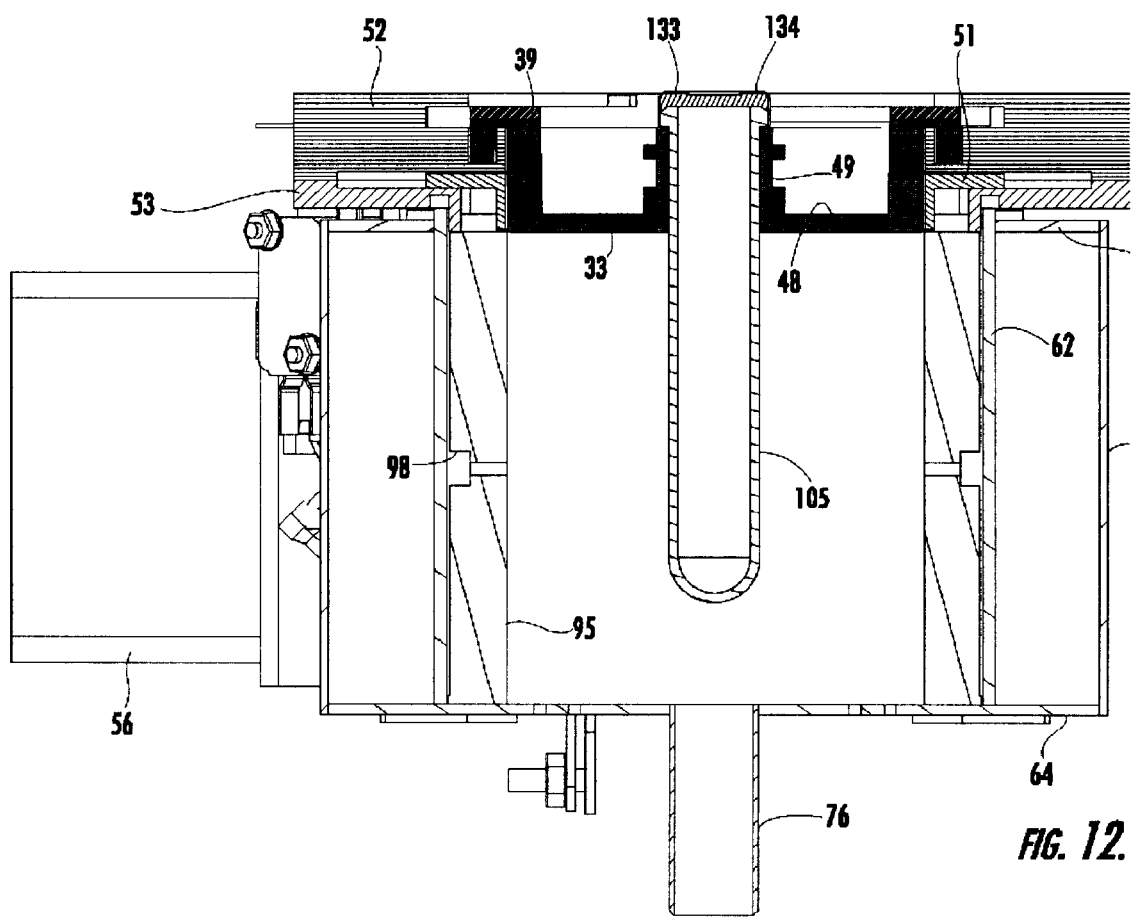
FIG. 12 is a cross sectional view of the cavity portion of the instrument according to the invention and including an exemplary reaction vessel.
Figure 13:
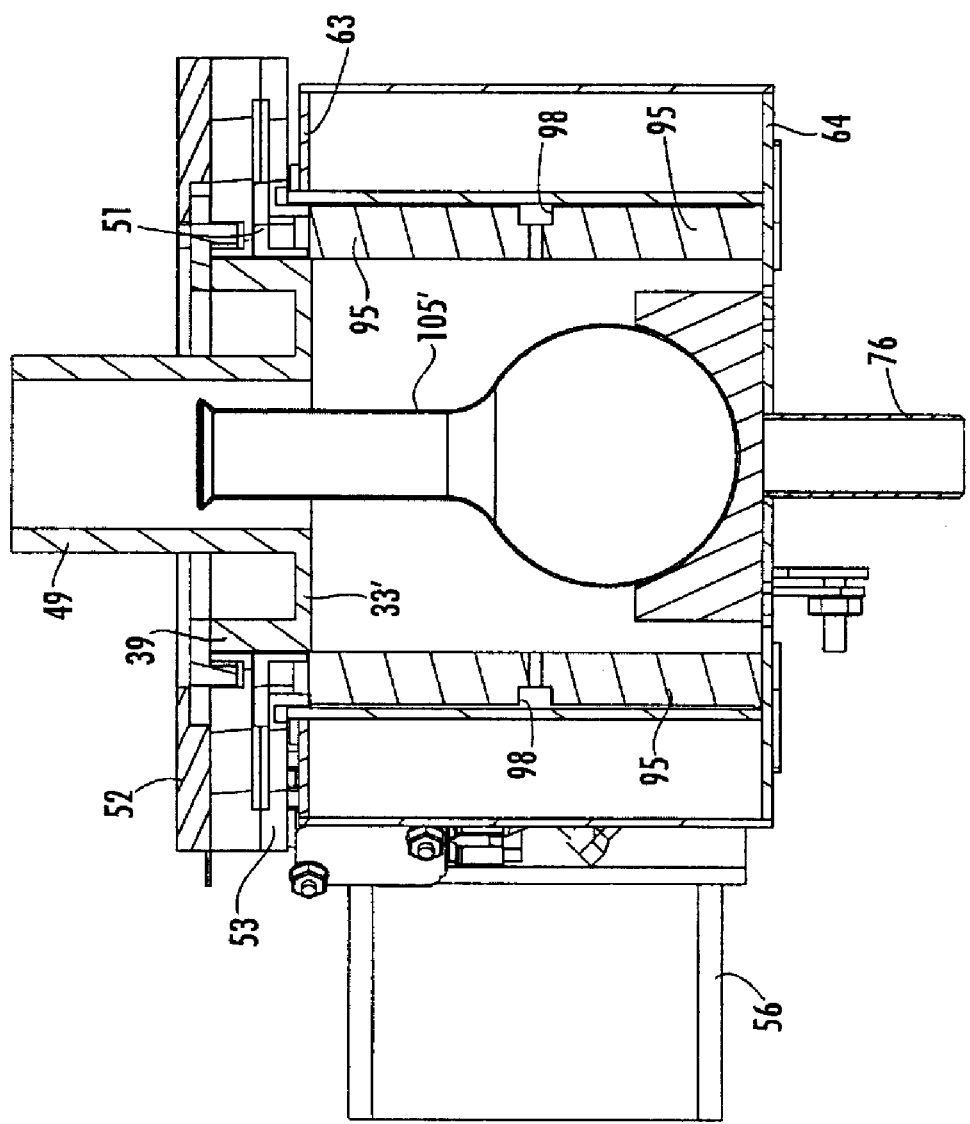
FIG. 13 is a cross-sectional view almost identical to FIG. 12, but illustrating the features of the invention in relation to a differently-sized reaction vessel.

FIGS. 12 and 13 illustrate some of the additional advantages of the removable attenuator system of the present invention. Many of the items illustrated in FIGS. 12 and 13 have also been previously described with respect to the other figures, and in such cases the same reference numerals will again refer to the same items. Both FIG. 12 and FIG. 13 are cross-sectional views with FIG. 12 being taken directly through the center of the cavity 45 and FIG. 13 being taken from a point at which an entire vessel is illustrated.

FIG. 12 shows the cavity housing 45, the inner cavity wall 62, the dielectric insert 95, and the removable attenuator 33. As illustrated in FIGS. 12 and 13, in the preferred embodiments of the invention the removable attenuator 33, which comprises the second portion of the two engaged portions that together form the upper horizontal wall of the cavity (the other being retaining ring 52), the attenuator 33 comprises an outer cylindrical wall 39 and an inner cylindrical wall 49, the inner and outer walls being separated by and perpendicular to an annular floor 48. The inner wall 49 thus provides a receptacle for receiving the vessel 105 therein, and likewise provides the attenuating function required to prevent microwaves generated by the source and propagated into the cavity from propagating outside the cavity when the vessel 105 is in place.

FIG. 13 is almost identical to FIG. 12 with the exception that the first attenuator 33 has been replaced a second attenuator 33' and the vessel 105; has been replaced with the round bottom flask 105' illustrated in FIG. 13. It will be immediately seen that the removable attenuators 33 and 33' provide a quick and easy method of exchanging reaction vessels without otherwise changing the size,: capability, function or operation of the overall instrument 20. Thus, for a larger vessel such as 105' illustrated in FIG. 13, the outer wall 39 of the attenuator 33' is essentially the same as the outer wall 39 of the attenuator 33 in FIG. 12. The inner cylindrical wall 49', however, is somewhat taller (in the orientation of FIG. 13), defines a larger diameter opening and provides for an attenuating function even though the flask 105' is larger than flask 105. By way of brief comparison, prior devices (e.g., No. 5,796,080) have attempted to customize the attenuator in a permanent sense for one particular sized vessel. Accordingly, an instrument that was capable of handling a somewhat smaller vessel such as 105 illustrated in FIG. 12 could not handle the larger vessel 105' illustrated in FIG. 13. Furthermore, because the attenuator had to be sized to accommodate the largest possible reaction vessels being used, the attenuator had to be permanently large, rather than just large enough for the particular vessel being used.

As one further advantage of the removable attenuators 33 and 33', in prior devices the diameter of the attenuator opening was kept large enough to receive the largest portion of the vessel. With respect to FIG. 13, this required the opening to be large enough to receive the bulb portion of the round bottom flash 105'. In turn, a larger diameter opening requires a taller (longer) attenuator to prevent microwaves from propagating beyond the attenuator.

In contrast, and as FIG. 13 illustrates, in the present invention, the attenuator need only be large enough to accommodate the nearby portions of the vessel 105' rather than the largest portions thereof. It will thus be understood as a further advantage that in some circumstances (e.g., FIG. 12) the attenuator 33 is put in place first, after which the vessel 105 is placed in the attenuator 33 and the cavity 61. In other circumstances (e.g., FIG. 13), the vessel 105' is placed in the cavity 67 first, after which the attenuator 33' is put into position.

Accordingly, in another aspect the invention comprises a method of carrying out chemical reactions using microwave assisted chemistry by carrying out a first reaction in a first vessel of a particular size; removing the vessel and the attenuator 33 from the cavity; replacing the vessel with a new, differently sized vessel, and then replacing the attenuator with a new differently sized attenuator that nevertheless fits into the same opening.

Figure 14:
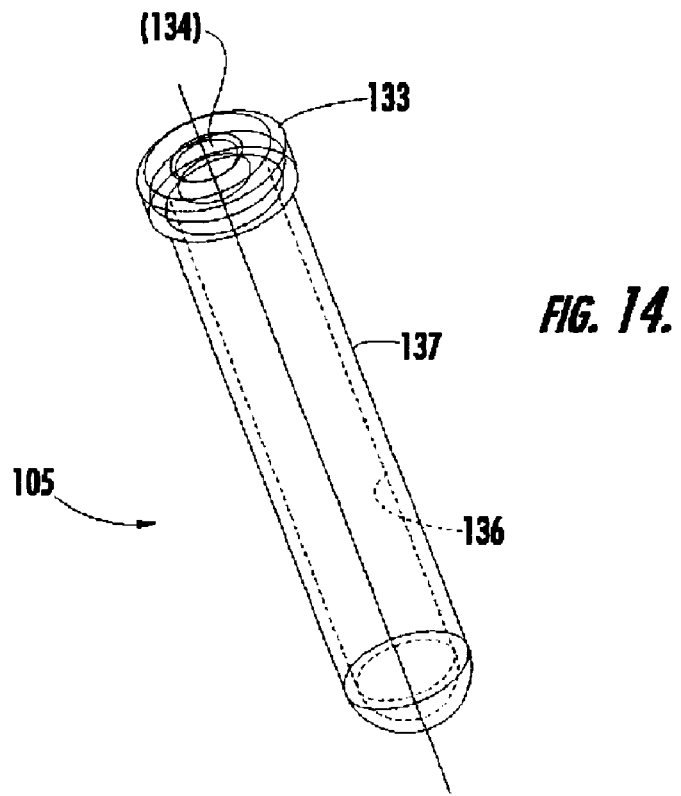
FIG. 14 is a perspective view of the reaction vessel and FIG. 15 is a cross-sectional view of the reaction vessel.
Figure 15:
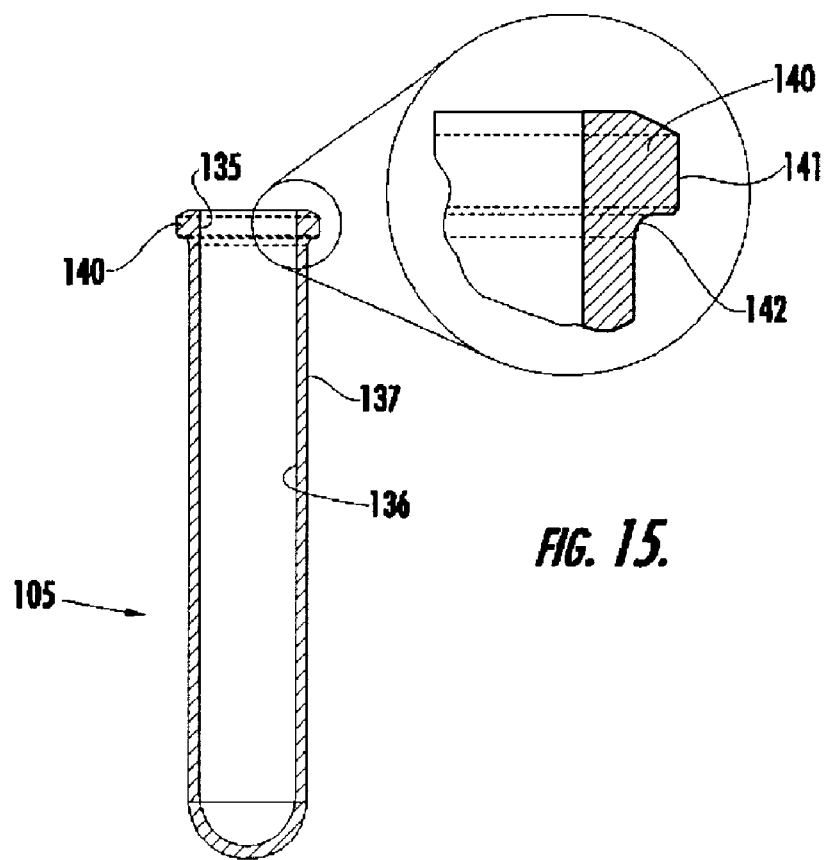

FIGS. 14 and 15 illustrate some details of the reaction vessel 105. FIG. 14 is a perspective view of the reaction vessel 105 alone, and illustrates that in certain (but not all) embodiments, it superficially represents a test tube in its cylindrical shape. As illustrated by the vessel 105' in FIG. 13, the reaction vessel can be one of any number of shapes and types while still incorporating the pressure-resistant aspects of the invention. FIG. 14 also illustrates the deformable metal portion 133 of the cap, along with an opening for the septum 134 (not shown) through which the needle 115 (not shown) can penetrate in a manner described with respect to the other drawings.

As stated previously, the vessel 105 is preferably pressure resistant; i.e., it can withstand pressures above atmospheric. This capability enables reactions to be carried out at elevated pressures, which can offer certain advantages in some circumstances. For example, particular reaction mechanisms can change in a favorable manner at above-ambient pressures, and in other circumstances, more efficient or even different (and better) mechanisms will take place at above ambient pressures. Additionally, under most circumstances, an increased pressure will produce or maintain an increased temperature, in accordance with the ideal gas law and its several related expressions. In turn, higher temperatures generally favorably initiate or accelerate most chemical reactions.

FIG. 15 illustrates some additional details of the vessel 105. As shown therein, the vessel 105 has at least a cylindrical portion, and as illustrated in FIG. 15, may be entirely cylindrical, with the cylindrical portion being defined by the concentric inner and outer walls 136 and 137 that terminate in a cylindrical opening 135. As illustrated in FIG. 15, the cylinder includes an annular rim 140 that extends outwardly from the circumference of the cylindrical opening 135 and defines a rim circumference 141 that is concentric with the cylindrical portion of the vessel 105 and the cylindrical opening 135.

The vessel 105 further includes a curved outer wall portion 142 between the concentric outer wall 137 and the rim circumference 141. In this regard, it has been discovered that under higher pressures, a perpendicular relationship between the outer wall 137 and the rim 140 tends to be the weakest point under stress applied from the interior of the vessel 105. It has been discovered according to the present invention, however, that by providing the curved outer wall portion 142, the pressure resistance of the vessel can be significantly increased. Specifically, in current embodiments, a reaction vessel with a 90-degree relationship at the portion described will withstand pressures up to about 200 pounds per square inch (psi) before failing. The curved outer wall portion 142 of the present invention, however, can withstand pressures of up to about 1000 psi.

The invention has been described in detail, with reference to certain preferred embodiments, in order to enable the reader to practice the invention without undue experimentation. A person having ordinary skill in the art will readily recognize that many of the components and parameters may be varied or modified to a certain extent without departing from the scope and spirit of the invention. Furthermore, titles, headings, or the like are provided to enhance the reader's comprehension of this document and should not be read as limiting the scope of the present invention.

What is claimed is:

1. An instrument for microwave-assisted chemical processes that avoids tuning discrepancies that otherwise result based upon the size and composition of the materials being heated, said instrument comprising:

a source of microwave radiation;

a waveguide in communication with said source, with at least a portion of said waveguide forming an annulus with a rectangular cross section;

a right cylindrical static cavity including a circular floor and a circular attenuator and immediately surrounded by said annular portions of said waveguide; and at least 3 slotted openings in the circumference of said annular waveguide that provide microwave communication between said waveguide and said static cavity and optimized coupling between microwaves from said source and materials being heated.

2. An instrument according to claim 1 wherein said microwave source is selected from the group consisting of magnetrons and klystrons.

3. An instrument according to claim 1 wherein said microwave source is a solid state source.

4. An instrument according to claim 1 wherein said waveguide includes seven slots equally spaced from one another by at least 40°.

5. An instrument according to claim 1 wherein said cylindrical cavity completes a fall 360°.

6. An instrument according to claim 1 wherein said annular waveguide completes more than 180°.

7. An instrument according to claim 1 wherein said annular waveguide completes between 270 and 360°.

8. An instrument according to claim 1 wherein said slotted openings are oriented parallel to the axis of said cylindrical cavity.

9. An instrument according to claim 1 wherein said waveguide is formed of metal.

10. An instrument according to claim 1 and further comprising means for measuring the temperature of items in said cavity.

11. An instrument according to claim 10 wherein said temperature measurement means comprises an infrared photo detector positioned to receive infrared radiation from items in said cavity.

12. An instrument according to claim 10 and further comprising means for moderating the application of microwaves in response to the measured temperature.

13. An instrument according to claim 12 wherein said moderating means comprises a processor in communication with said source and said temperature measurement means for moderating the output of said source in response to the measured temperature.

14. An instrument according to claim 1 and further comprising means for measuring the pressure in said cavity.

15. An instrument according to claim 14 comprising a pressure transducer.

16. An instrument according to claim 4, and further comprising means for moderating the application of microwaves in response to the measured pressure.

17. An instrument according to claim 16 wherein said moderating means comprises a processor in communication with said source and said pressure measurement means for moderating the output of said source in response to the measured pressure.

18. An instrument according to claim 1 and further comprising means for cooling said cavity in response to elevated temperatures resulting from chemical reactions being carried out in said cavity.

19. An instrument according to claim 1 and further comprising a cylindrical dielectric insert inside said cavity and adjacent the circumference of said cavity.

* * * * *